United States Patent [19]

Homura

[11] 4,334,820
[45] Jun. 15, 1982

[54] BUCKET SYSTEM PROVIDED WITH TILTING MEANS APPLICABLE TO FORK LIFT

[76] Inventor: Kanematsu Homura, 30-1 Yagi 1 chome, Kanazawa-shi, Ishikawa-ken, Japan

[21] Appl. No.: 58,465

[22] Filed: Jul. 18, 1979

[30] Foreign Application Priority Data

Aug. 17, 1978 [JP] Japan ............................ 53-111972[U]
Oct. 5, 1978 [JP] Japan ................................ 53-122806

[51] Int. Cl.$^3$ ...................... B65G 67/00; B65B 21/02
[52] U.S. Cl. ................................ 414/607; 414/414; 414/422; 414/423; 298/23 D; 298/22 F; 298/11
[58] Field of Search ............... 414/607, 608, 414, 422, 414/423, 645, 651; 298/11, 17 B, 19 V, 22 F, 21 V, 23 D, 23 DF

[56] References Cited

U.S. PATENT DOCUMENTS

| | | | |
|---|---|---|---|
| 1,288,678 | 12/1918 | Raymond | 298/23 D |
| 2,713,431 | 7/1955 | Koehler | 414/651 X |
| 2,718,431 | 9/1955 | Pietroroia | 298/11 X |
| 2,762,518 | 9/1956 | Streb et al. | 414/607 |
| 3,007,592 | 11/1961 | Adams | 414/607 |
| 3,125,236 | 3/1964 | Huff | 414/607 |
| 3,207,346 | 9/1965 | Beutler et al. | 414/607 |
| 3,270,900 | 9/1966 | Sherman | 414/422 X |
| 3,448,880 | 6/1969 | Howard | 414/607 |
| 4,200,334 | 4/1980 | Lindholm | 298/22 F X |

FOREIGN PATENT DOCUMENTS

1391056 1/1965 France ............................. 414/651

*Primary Examiner*—Trygve M. Blix
*Assistant Examiner*—R. B. Johnson

[57] ABSTRACT

A bucket system incorporating a tilting mechanism comprises a pair of horizontal arms each provided integrally with a pair of stanchions having an arcuate bend in the upper portion thereof and having one or more pulleys disposed at the leading end of the arcuately bent upper portion, a bucket rotatably fastened to the pair of horizontal arms, and a pair of cables fastened at one end thereof to the lower end of the rear side of the bucket, passed over the pulleys on the stanchions, and again fastened at the other end thereof to a stationary mast on the fork lift, whereby elevation of the two-pronged platform of the fork lift whose two prongs are inserted into and held within the pair of horizontal arms causes the cables to stretch to their full length and thereby draw up the lower end of the rear side of the bucket so as to tilt the bucket as a whole and de-elevation of the two-pronged platform from its elevated position causes the bucket to return to its original horizontal position.

8 Claims, 13 Drawing Figures

BUCKET SYSTEM PROVIDED WITH TILTING MEANS APPLICABLE TO FORK LIFT

BACKGROUND OF THE INVENTION

This invention relates to a bucket system incorporating a tilting mechanism, which bucket system is attachable to a fork lift.

The inventor has originated a system for converting a fork lift into a wheeled machine capable of dumping waste, scooping up snow and doing other hauling jobs by having mounted on the two-pronged platform of the fork lift a bucket adapted to be automatically tilted by means of cables. In view of the prior art as disclosed by (A) U.S. Pat. No. 2,713,431 filed on July 19, 1955, (B) U.S. Pat. No. 3,877,593 filed on Apr. 15, 1975, (C) Japanese Utility Model Laid-Open Publication No. 156174/1976 published on Dec. 13, 1976, (D) Japanese Utility Model Laid-Open Publication No. 2767/1977 published on Jan. 10, 1977, (E) Japanese Patent Publication No. 11615/1968 published on May 16, 1968 and (F) Japanese Utility Model Publication No. 996/1972 published on Jan. 14, 1974, the inventor now proposes herewith a bucket system incorporating a tilting mechanism, which bucket system is attachable to an ordinary fork lift without need for any special mechanical modification.

Now, the references cited above will be described briefly. Reference (A) discloses a construction having a rotatable bin attached to the lifting unit of a fork lift in such a way that when the lifting unit is raised, the cables connected to the fork lift proper draw the cable arms secured to the bin and consequently cause the bin to be tilted. References (C) and (D) also relate to a mechanism such that a bucket (or bin) mounted on the fork lift proper is tipped over in consequence of the elevation of the lifting unit of the fork lift. In the constructions disclosed by these references, there are invariably incorporated cables which are each connected at one end thereof to the rear portion of a bucket rotatably attached to the leading ends of the prongs of the fork, passed over the upper end of a movable mast of the fork lift, and again connected at the other end thereof to the rear face of the mast opposite the bucket. As the lifting unit is raised, the cables draw up the rear side of the bucket and cause whatever is contained in the bucket to be dumped out. The mechanism disclosed by each of References (A), (C) and (D), therefore, entails a disadvantage that the fork lift itself requires a modification to permit incorporation of the mechanism and the mast of the fork lift requires a great height to provide ample tilting of the bucket. Besides, the cables frequently jeopardize the safety of the fork lift operator as by sliding off the pulleys at the upper ends of the post or by being suddenly broken because of the excessive strain resulting from the extremely sharp bend of the cables on the pulleys.

References (B) and (F) both involve a mechanism whereby the mast of the fork lift and the two-pronged platform are kept in a backwardly slanted state to retain the bucket in its normal horizontal position and they are pushed forwardly to tilt the bucket. Because of the movement thus involved in tilting the bucket, this mechanism suffers from notably inferior operability.

Reference (E) discloses a construction wherein the bucket is divided into a frame member and a cover member and these component members of the bucket are given respective sliding motions required for loading and unloading the bucket. Again in this case, the fork lift suffers from poor operability because the mechanism is complicated.

The conventional bucket systems designed for use on fork lifts are either produced by remodelling conventional fork lifts or designed from the beginning for the exclusive purpose of loading and dumping. Thus, the fork lifts to which such bucket systems are attached cannot be converted into normal fork lifts. This brings about the following disadvantages. A fork-lift-with-bucket designed for scooping up snow, for example, cannot be put to effective use in any season other than the winter. If the same fork-lift-with-bucket is employed for moving dirt, for example, it cannot be used for such jobs as the conveyance of stacks of articles within factory premises, for which a regular fork lift is very well suited. In short, known fork lifts with bucket systems have limited uses.

An object of the present invention is to provide a bucket system incorporating a tilting mechanism which can be attached to any ordinary conventional fork lift without requiring any special modification and can readily be removed from the fork lift when it is desired to use the fork lift by itself.

Another object of the present invention is to provide a bucket system incorporating a mechanism capable of enabling the bucket proper to be tilted with high efficiency, preventing the cables used for drawing the bucket proper from being exposed to excessive stress and to consequent accidental breakage, and precluding the cables from unexpected slippage from the pulleys over which they are trained.

A further object of this invention is to provide a bucket system having a front cover adapted to be automatically opened and closed to suit the purpose of use.

SUMMARY OF THE INVENTION

To accomplish the objects described above according to the present invention, there is provided a bucket system incorporating a tilting mechanism, which comprises:

a bucket-supporting frame composed of a pair of sheath-like horizontal arms capable of admitting the pair of prongs constituting the platform of a fork lift, a pair of stanchions rising one each from the pair of horizontal arms on the side thereof for admitting the prongs, having the respective upper portions thereof arcuately bent forward away from the fork lift, and incorporating a pair of pulleys one each at the leading ends of the arcuately bent upper portions and means for preventing cables trained over the pulleys from deviating from the pulleys, and beams serving to keep the pairs of horizontal arms and stanchions at fixed distances;

a bucket rotatably attached at the front bottom end thereof to the leading ends of the arms; and a pair of cables connected at one end thereof to the lower portion of the rear side of the bucket, trained over the pulleys on the stanchions of the bucket-supporting frame and fastened at the other end thereof to the mast of the fork lift.

The bucket system is complete in itself and independent of the fork lift. It can be applied to any of the fork lifts available on the market as a simple attachment. When the fork lift to which this bucket system is attached is to be used for operations which have no use for the bucket system, the bucket system can readily be removed from the fork lift and the fork lift can then be operated to fulfill its ordinary function. Safe use of the cables is ensured by the incorporation of arcuate bends in the stanchions and the combination of the pulleys and the means for protecting the pulleys against possible slippage of the cables from the pulleys. What is more, the bucket system permits the bucket to be tiled forwardly with high efficiency. Further, since the bucket is provided at the front open portion thereof with a front cover capable of automatically opening and closing the open portion in accordance with the rising and falling motion of the movable mast of the fork lift, the conveyance and dumping of material from the bucket can be carried out with improved efficiency.

The other objects and characteristic features of the present invention will become apparent from a detailed description of this invention with reference to the accompanying drawing.

DESCRIPTION OF THE PREFERRED EMBODIMENTS

Figure 1A:
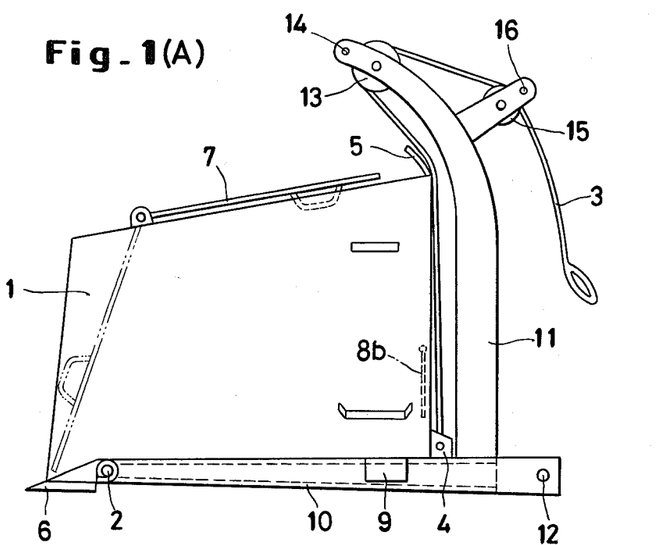
FIGS. 1A and 1B are a side view and a rear view respectively of one preferred embodiment of the bucket system of the present invention incorporating a tilting mechanism and attachable to a fork lift.
Figure 1B:
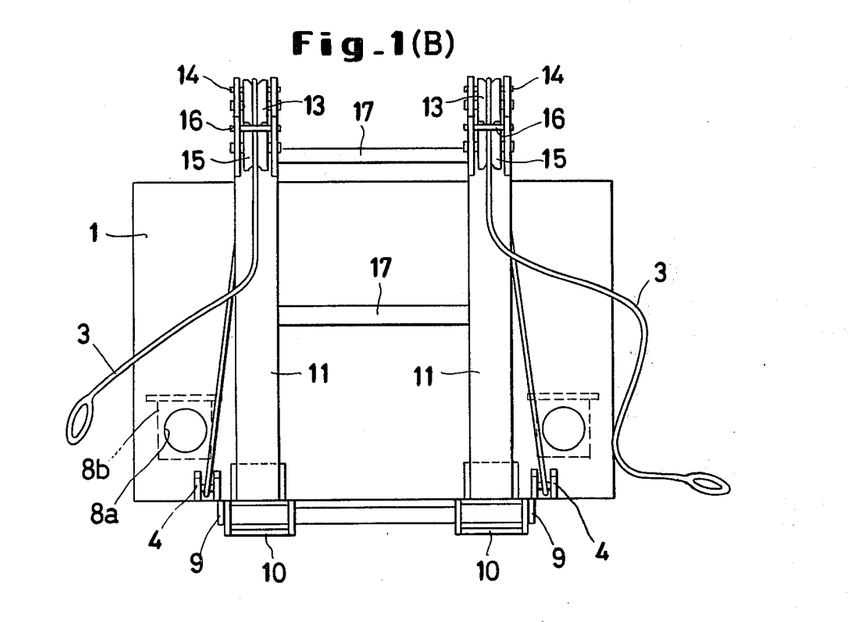

This invention relates to a bucket system incorporating a tilting mechanism, which system is readily attached to or detached from a fork lift, as illustrated in FIGS. 1A and 1B.

This bucket system is composed of a box-shaped bucket and a bucket-supporting frame consisting of a pair of horizontal arms 10 and a pair of stanchions 11. The front end of the base of the bucket 1 and the leading ends of the horizontal arms 10 are rotatably connected to each other by shaft 2. The horizontal arms 10 have a hollow sheath-like structure to accommodate completely therein the entire length of the prongs constituting the platform of the fork lift L. The horizontal arms are provided at the rear ends thereof with pinholes 12 for the insertion of pin rods which serve to keep the horizontal arms attached fast to the prongs accommodated therein. The stanchions 11 are vertically fastened to the horizontal arms near the rear ends thereof. These stanchions are provided at the upper ends thereof with guide pulleys 13 and subsequent auxiliary pulleys 15. These pulleys are provided with means 14, 16 adapted to prevent the cables trained over the pulleys from deviating from the pulleys. The horizontal arms and stanchions are paired in laterally opposed locations and held fast in position with horizontal beams 17 to complete a bucket-supporting frame.

Figure 2:
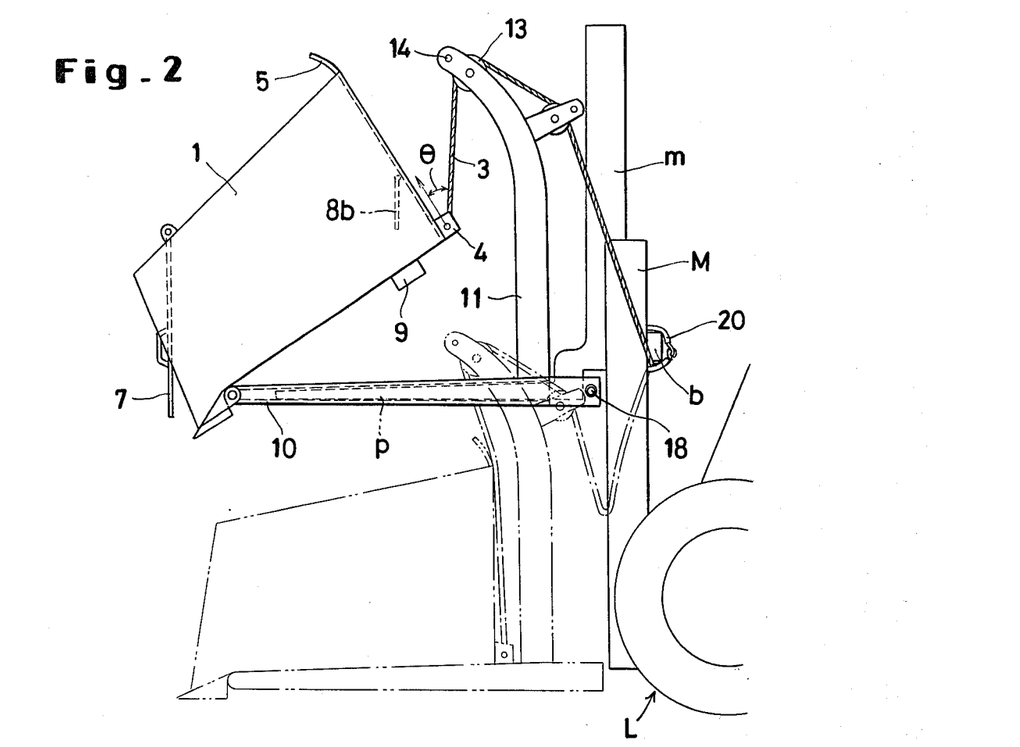
FIG. 2 is a side view of the bucket system of FIG. 1 with the bucket held in a forwardly tilted position.

The cables 3 are connected at one of their ends to the connecting shaft 4 at the lower rear portion of the bucket and then trained over the pulleys 13, 15 and led off behind the stanchions 11. When these cables are drawn at their other ends, the bucket is tilted forwardly with the shaft 2 as a fulcrum as illustrated in FIG. 2. In this case, the force exerted to draw the cables (ropes or chains) may be relatively weak because the stanchions 11 used in the bucket system of this invention have their leading portions arcuately bent forward.

In the conventional mechanism wherein the cables are connected to the movable mast of the fork lift and they are drawn upwardly in consequence of the elevation of the movable mast, the angle $\theta$ formed by the cables where the cables are connected to the bucket is greater than in the mechanism wherein there are used arcuately bent stanchions as in the present invention. The force exerted to draw the cables inevitably increases in proportion to the angle $\theta$. In the mechanism of the present invention, therefore, the burdon exerted on the cables is smaller than that involved in the conventional mechanism. As a natural consequence, the possibility of the cables breaking under excessive stress can be precluded by the present invention.

Figure 3:
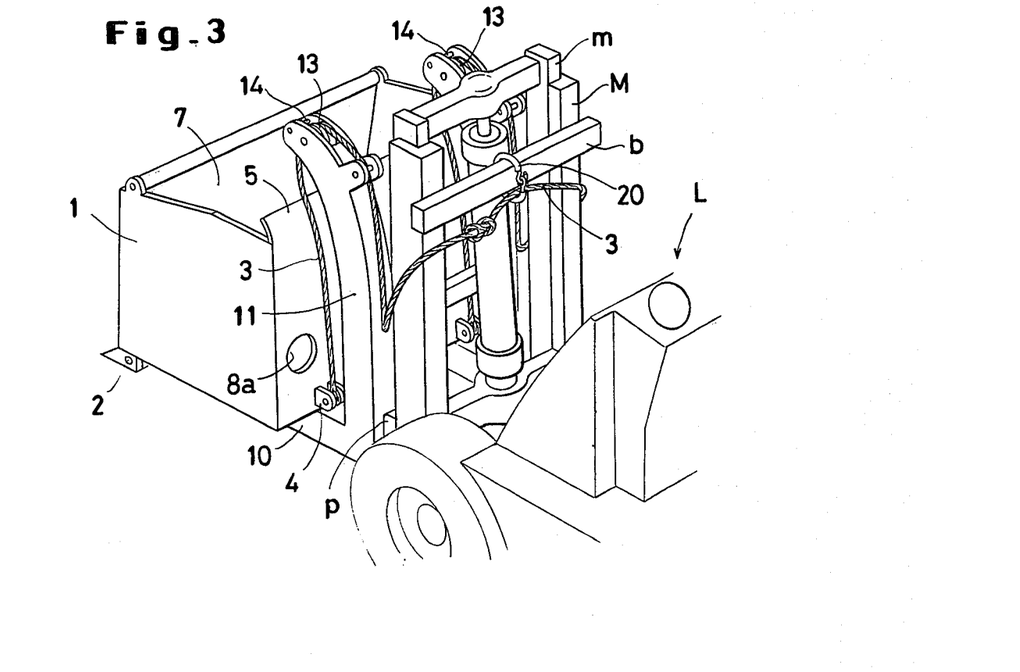
FIG. 3 is a perspective view of the bucket system of FIG. 1 attached to a fork lift.

Further, the rear wall of the bucket 1 is extended upwardly and then curved fowardly to form a cable-protecting board 5. This cable-protecting board 5 is effective in preventing the cables from being injured by the upper edge of the rear wall of the bucket while the cables are being drawn upwardly. The bucket is provided at the front end of its base with a shovel blade 6 adapted to facilitate the scooping of waste material, earth, snow etc. When the material to be picked up by the bucket is a powder or other readily flowing substance, the bucket system ay be provided with a freely openable and closable front cover 7 as illustrated. For the purpose of enabling the operator of the fork lift to confirm, visually, perfect discharge of the load from the tilted bucket, peepholes 8a may be provided in the rear wall of the bucket and hanging covers 8b placed in front of the peepholes 8a so that the hanging covers 8b will pivot away from the peepholes 8a to give the operator a line of vision through the rear wall of the bucket during the forward tilting of the bucket. The bucket is provided on the bottom thereof with guide means 9 adapted to adjoin the outer lateral surfaces of the horizontal arms 10 so as to keep the bucket in position. Attachment to a fork lift of the bucket system of this invention having the construction described above is accomplished by placing the bucket system on the ground surface, lowering the two-pronged platform of the fork lift to its lowermost position and bringing it up to the rear side of the bucket system, further advancing the fork lift and thereby allowing the two prongs of the platform to enter the inner cavities of the horizontal arms 10 of the bucket system and, upon completion of the insertion. passing a pin rod 18 through each of the pinholes 12 at the rear ends of the horizontal arms so as to prevent the inserted prongs from slipping out of the horizontal arms. As the pin rod, two sets each of a bolt and nut or some other similar means may be used for independent insertion through the two laterally opposed horizontal arms. Since use of such independent sets in the separate pinholes entails troublesome work, it is more desirable to use a long rod adapted to penetrate through the two separated pinholes. This long rod allows safe and simple attachment when it is provided at one end thereof with a flange and at the other end with irremovable means of a springy construction. After the bucket-supporting frame has been fastened to the fork lift as described above, two cables which are laid in a laterally opposed relationship are tied up and passed over the stationary mast M of the fork lift L and led away behind the mast in the present preferred embodiment. When necessary, they may be replaced with one cable of a suitable length. In the case of a fork lift such as is illustrated in FIGS. 2 and 3, for example, the tied end of the two cables may be fastened to the rear side of a beam b which slightly protrudes in opposite directions from the width of the stationary mast M of the fork lift L. When the movable mast m which is integrally formed with the two-pronged platform p is raised as held in the state described above, the cables are caught by the opposite protuberances of the beam b and are stretched so much as to pull up the rear end of the bucket 1 as illustrated in FIG. 2. A hooking piece 20 may be used in order to keep the tied end of the cables fastened to the beam so that the cables will be prevented from hanging down behind the stationary mast of the fork lift when the two-pronged platform is lowered to return the bucket to its original horizontal position. In the present illustrated embodiment, a band of a suitable material is used as the hooking piece 20. This piece fulfills its function sufficiently so long as it possesses strength enough to keep the cables fastened to the beam while the platform of the fork lift is lowered.

Figures 4A, 4B:
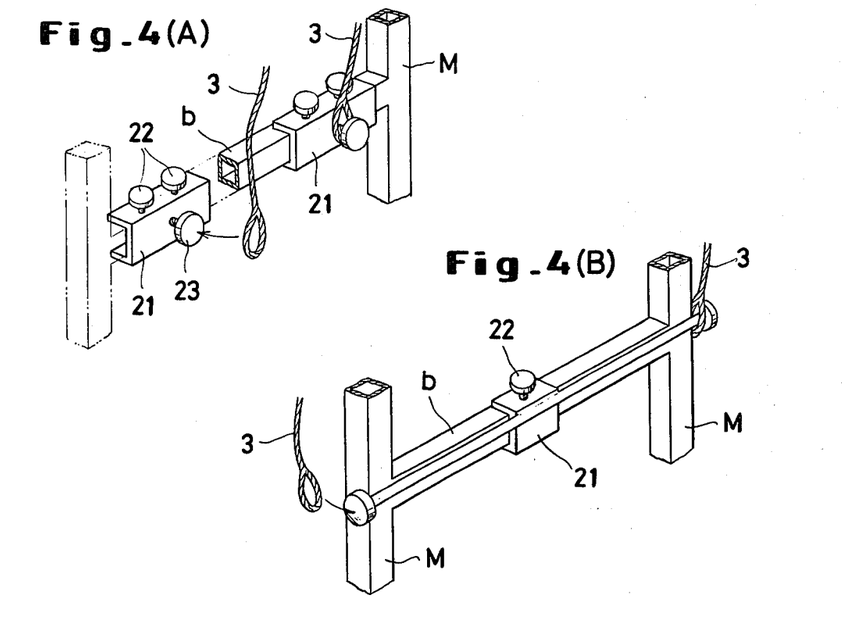
FIGS. 4A to 4D are perspective views of means used for fastening the cables of the bucket system at the one ends thereof to the stationary mast of the fork lift.
Figure 4C:
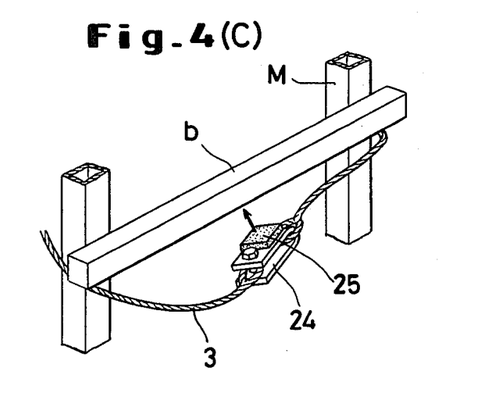
Figure 4D:
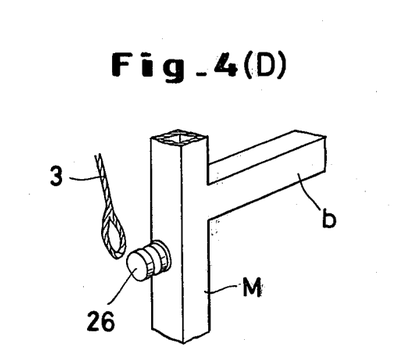

In case where the beam of the stationary mast of the fork lift does not protrude in opposite direction from the width of the mast, required fastening of the cables to the mast may be accomplished by using any of the auxiliary means serving to keep the cables hooked to the beam as illustrated in FIGS. 4A through 4D. The hook means 21 of FIG. 4A comprises a pair of fasteners each formed of a frame of a U-shaped cross section conforming to the three sides of the beam b, a clamping screw 22 provided on one lateral side of the frame and a stud 23 disposed so as to protrude from one side of the frame of the U-shaped cross section. The cables are fastened at one end thereof to the studs 23 of the fasteners. In the present preferred embodiment, there are provided two hook means so as to correspond to the two laterally opposed cables. Otherwise, there may be disposed one such hook means fixed at the center of the beam b so that the two cables will be fastened together to the sole stud 23. The hook means of FIG. 4B comprises a frame of a U-shaped cross section conforming to the three sides of the beam b, a prolonged rod integrally attached at the center thereof to the bottom of the frame of the U-shaped cross section and extended in opposite directions past the ends of the beam and a pair of discs integrally attached one each to the opposite ends of the rod. In this case, attachment of the cables to the beam is accomplished by setting the frame in position on the beam b, and having the ends of the cables fastened to the discs. The hook means of FIG. 4C comprises a connector means 24 adapted to fasten the ends of cables to each other and a permanent magnet 25 attached fast to one part of the connector means 24. In this case, fastening of the cables is attained by having the ends of cables tied to the connector means 24 as illustrated and causing the connector means 24 to be magnetically attracted onto the beam b. FIG. 4D illustrates another preferred embodiment of the hook means, which comprises a pair of hook metals 26 such as those which, as illustrated, are possessed of grooves for ensuring safe retention of the hooked ends of cables and fastened one each directly to the opposite faces of the stationary mast M as by welding. Fastening of the cables, in this case, is obtained by simply inserting the hook metals 26 into the loops of the cable ends.

After the bucket system has been attached to the fork lift as described above, the fork lift as held in the state indicated by the imaginary lines of FIG. 2 is driven forward in the direction of a heap of waste material so that the bucket will drive itself into and scoop in part of the heap. For removal of the waste from the bucket, the two-pronged platform p of the fork lift has only to be raised as illustrated by the solid line of FIG. 2. Consequently, the lower end of the rear side of the bucket is smoothly hoisted by the cables which are securely hooked on the beam b of the stationary mast of the fork lift L, with the result that the bucket itself is tilted forwardly. Since the hanging covers 8b pivot away from the peepholes 8a by their own weight, the fork lift operator can keep an eye on the waste being dumped out of the bucket through the unobstructed peepholes. After the bucket has been emptied, the operator lowers the two-pronged platform to return the bucket to its original horizontal position.

Figure 5:
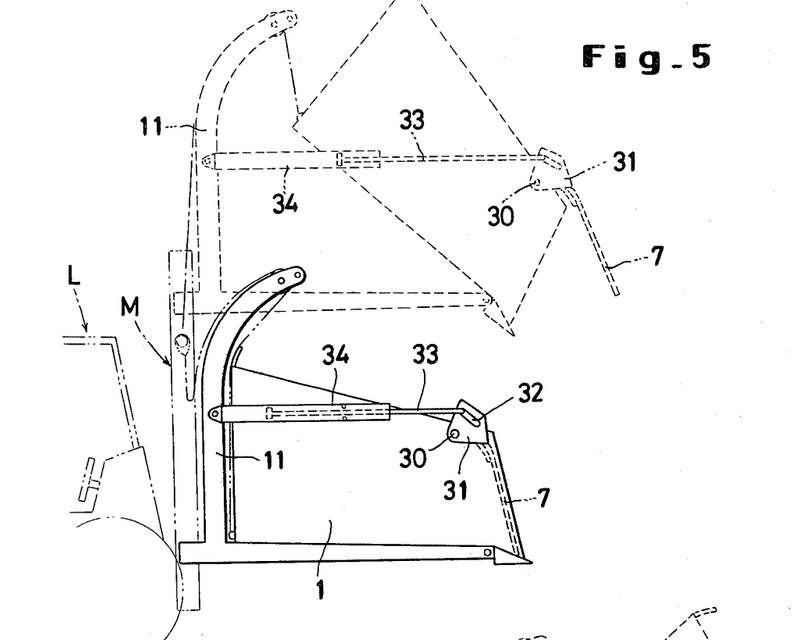
FIG. 5 is a side view of a preferred embodiment of the bucket system of this invention provided with a mechanism capable of automatically opening and closing the front cover of the bucket.

In the bucket system of the construction described above, when the bucket is tilted forwardly to dump the waste from the bucket, the front cover 7 of the bucket automatically separates from the bucket proper and opens the front side of the bucket. Since the opening thus formed is not large enough, there ensues a disadvantage that light weight waste material will not readily force its way through the opening but will be retained in the bucket. To overcome this problem, a mechanism may be provided which, as illustrated in FIG. 5, serves the purpose of positively opening the front cover 7 of the bucket. This mechanism has a pair of arm plates 31 integrally joined to the shaft 30 of the front cover 7 and disposed outside the lateral surfaces of the bucket. Each arm plate 31 is provided with a slot 32, wherein is slidably set one end of a means having the other end fastened to the mast and serving to regulate the rotation of the arm plate. This rotation-regulating means has a rod 33 and a cylinder 34 attached to each other in a freely extensible and contractible manner. When the bucket is held in its horizontal position, the front cover 7 continues to hang down owing to its own weight and keeps the front side of the bucket closed. When the two-pronged platform elevates and the bucket is tilted forwardly by the drawing foce exerted upon the rear end of the bucket by the cables, the shaft 30 of the front cover is allowed to shift its position away from the stanchions 11 toward the front. With the aid of the rotation-regulating means, the arm plates 31 prevent the front cover from hanging down and keep the front side of the bucket open widely as indicated by the dotted lines of the drawing.

Figure 6:
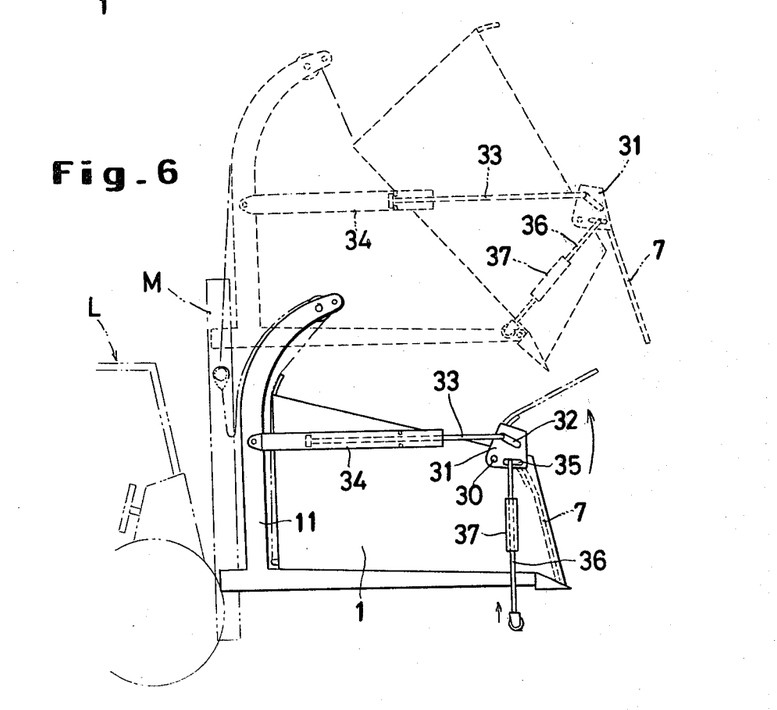
FIG. 6 is a side view of another preferred embodiment of the bucket system of this invention provided with a mechanism capable of automatically opening and closing the front cover of the bucket.

FIG. 6 illustrates another preferred embodiment of the door-opening mechanism described above. This mechanism incorporates an additional mechanism capable of allowing the front cover of the bucket to be automatically opened when the fork lift is driven forward to scoop the waste into the bucket. The additional mechanism has another slot 35 provided in each of the arm plates 31 and having fitted slidably in the slot 35 a rod 36 which is provided at the free end thereof with a caster and fastened slidably with a guide 37 onto the bucket proper 1. An upward thrust of the rod 36 causes the arm plates 31 to rotate about the shaft 30 as the fulcrum, with the result that the front cover 7 is opened upwardly. The upward thrust of the rod 36 is caused by lowering the bucket 1 to its lowermost position and consequently allowing the caster of the rod 36 to collide with the ground surface. In other words, as the fork lift is driven forward, the bucket thrusts itself into the heap of waste with its bottom lowered to the extent of practically sliding over the ground surface. The waste is consequently scooped into the bucket. When the waste held in the bucket is dumped, the mechanism permits the front cover of the bucket to be automatically opened widely as in the preferred embodiment of FIG. 5. When the bucket is lowered after the dumping of the waste, it is returned to the position indicated by the solid lines in the drawing.

Figure 7:
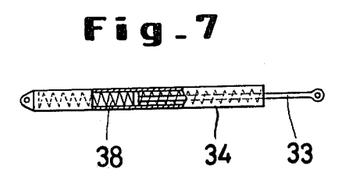
FIG. 7 represents another preferred embodiment of the means for controlling the rotation of arms in the mechanism for the automatic opening and closing of the front cover as illustrated in FIGS. 5 and 6.
Figure 8:
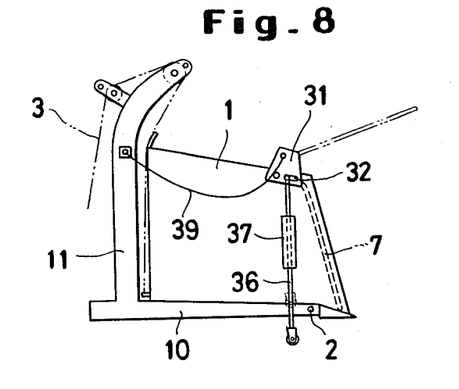
FIG. 8 is a side view of the bucket system using yet another preferred embodiment of the means for controlling the rotation of arms.

The cylinders 34 which serve to assist in facilitating the extension and contraction of the rods 33 may be of a simple structure as shown in the preferred embodiments described above. For the purpose of absorbing the impacts originating in the opening and closing motions of the front cover 7, these cylinders 34 may be provided with coil springs as illustrated in FIG. 7.

Figure 9:
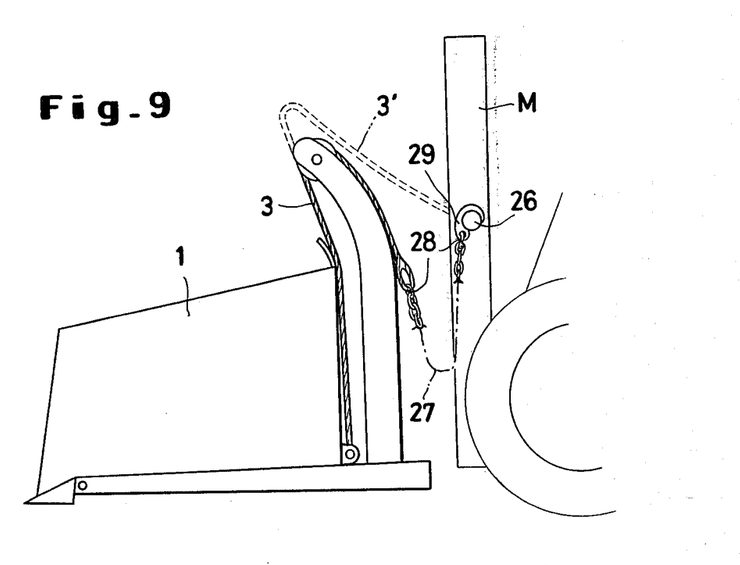
FIG. 9 is a side view of still another preferred embodiment of the bucket system of the present invention.

The inventor has actually manufactured bucket systems of the constructions described above and has demonstrated that they exhibit outstanding performance in terms of function, adaptability and operation. He has given them field tests under varying conditions with a view to adopting measures devised to ensure perfection of their operations. This invention, therefore, aims also to provide a method for overcoming the following inconvenience. When the bucket system on the fork lift is used for disposal of a heavy substance, for example, the cables 3 used for tilting the bucket must be made of steel wires of high strength and rigidity. Such cables may be wound and twisted and eventually caused to slide off the pulleys as indicated by the dotted lines 3' (FIG. 9) especially when the pulleys are not provided with pins devised specifically to prevent such slippage of the cables. This trouble is prevented by use of a pair of chains 27 each provided at the opposite ends thereof with connecting metals 28, one of which is joined to the end loop of the cable 3 and the other of which to the hook 29. For this purpose, the stationary mast M of the fork lift is provided with a hook metal 26 as illustrated in FIG. 4D, so that the hook 29 will be fastened to that hook metal 26. Consequently, the cables 3 are always kept in their fully stretched state by the weight of the chains 27 and are prevented from sliding off the pulleys owing to unwanted kinks and twists in the cables.

As described above, the bucket system of the present invention can be applied to any ordinary fork lift without requiring any structural modification of the fork lift. The bucket system can easily be attached to and detached from the fork lift; the work is easy because there is no need for the operator to climb the main mast of the fork lift to set the cables in position over the pulleys. Moreover, the waste loaded in the bucket can be dumped without requiring the main mast to be tilted foward and consequently causing the fork lift to lose its balance. The fact that the stanchions of the bucket-supporting frame are arcuately bent forwardly contributes much to decreasing the force to be used for hoisting the bucket. This means that the possibility of the cables being snapped by excessive stress is notably diminished. Thus, the bucket system of the present invention is characterized by outstanding features such as great adaptability, safety of operation and ease of handling.

What is claimed is:

1. A bucket system adapted to be attached to a fork lift having a stationary mast and a mast movable therealong for elevation and formed integrally with a two-pronged platform, which system comprises
   (a) a bucket-supporting frame composed of a pair of sheath-like horizontal arms having leading ends and rear ends capable of receiving the two-pronged platform, a pair of unitary and rigid stanchions extending vertically from the horizontal arms, each stanchion having a lower end fixedly connected to a respective one of the horizontal arms near the rear end thereof and a leading end opposite the lower end arcuately bent forwardly away from the rear end, and beams serving to brace the horizontal arms and stanchions for maintaining them at a fixed distance;
   (b) at least one pair of pulleys mounted on the leading ends of the stanchions;
   (c) a bucket having a bottom, a rear side and defining a front opening, the bottom having a front end remote from the stanchions;
   (d) a front cover disposed in the front opening;
   (e) a shaft freely pivotally suspending the front cover on the bucket for opening and closing the front opening;
   (f) an arm plate integrally joined to the shaft and defining a slot;
   (g) a pivoting control means for the front cover,
      (1) one end of the control means being slidably set in the slot of the arm plate and another end thereof being fastened to a respective one of the stanchions whereby the pivoting of the front cover on forward tilting of the bucket is controlled to allow the front opening of the bucket to be opened widely;
   (h) means rotatably attaching the front bottom end of the bucket to the leading ends of the horizontal arms;
   (i) a pair of cables connected at one end thereof to the rear side of the bucket near the bottom thereof, trained over the pulleys and having another end thereof fastened to the stationary mast of the fork lift whereby elevation of the two-pronged platform stretches the cables until they pull up the rear side of the bucket near the bottom thereof and tilt the bucket forwardly about the means rotatably attaching the front bottom end of the bucket to the leading ends of the horizontal arms.

2. The bucket system according to claim 1, which further comprises a freely detachable hook means adapted to enable the cables to be hooked to the stationary mast of the fork lift.

3. The bucket system according to claim 1, which further comprises a hook means integrally joined to the stationary mast of the fork lift for the purpose of enabling the cables to be hooked to the stationary mast.

4. The bucket system according to claim 1, wherein the pivoting control means comprises a rod and a cylinder attached to each other in a freely extensible and contractible manner.

5. The bucket system according to claim 4, wherein the pivoting control means further comprises a coil spring in the cylinder for absorbing impacts from opening and closing motions of the front cover.

6. The bucket system according to claim 1, wherein the pivoting control means comprises a cable.

7. The bucket system according to claim 1, further comprising a pair of chains respectively connected at one end thereof to the other end of a respective one of the cables and at another end thereof to the stationary mast whereby the stretched cables tilting the bucket are maintained in their stretched state by the weight of the chains and the cables are thereby prevented from sliding off the pulleys.

8. A bucket system adapted to be attached to a fork lift having a stationary mast and a mast movable therealong for elevation and formed integrally with a two-pronged platform which system comprises (a) a bucket-supporting frame composed of a pair of sheath-like horizontal arms having leading ends and rear ends capable of receiving the two-pronged platform, a pair of unitary and rigid stanchions extending vertically from the horizontal arms, each stanchion having a lower end fixedly connected to a respective one of the horizontal arms near the rear end thereof and a leading end opposite the lower end arcuately bent forwardly away from the rear end, and beams serving to brace the horizontal arms and stanchions for maintaining them at a fixed distance;

(b) at least one pair of pulleys mounted on the leading ends of the stanchions;

(c) a bucket having a bottom, a rear side and defining a front opening, the bottom having a front end remote from the stanchions;

(d) a front cover disposed in the front opening;

(e) a shaft freely pivotally suspending the front cover on the bucket for opening and closing the front opening;

(f) a pair of arm plates integrally joined to the shaft;

(g) a respective rod haning at one end from a respective one of the arm plates and having a lower free end;

(h) casters at the free ends of the rods whereby a thrust imparted to the rods causes the front cover to open widely;

(i) means rotatably attaching the front bottom end of the bucket to the leading ends of the horizontal arms;

(j) a pair of cables connected at one end thereof to the rear side of the bucket near the bottom thereof, trained over the pulleys and having another end thereof fastened to the stationary mast of the fork lift whereby elevation of the two-pronged platform stretches the cables until they pull up the rear side of the bucket near the bottom thereof and tilt the bucket forwardly about the means rotatably attaching the front bottom end of the bucket to the leading ends of the horizontal arms.

* * * * *